Feb. 23, 1926. 1,573,800
J. BOULLION ET AL
MULCHING DEVICE FOR PLANTERS
Filed Sept. 7, 1923 2 Sheets-Sheet 1

Inventors:
John Boullion.
George Boullion.
Paul Boullion.

By Milo B. Stevens & Co.
Attorneys

Inventors:
John Boullion.
George Boullion.
Paul Boullion.

Patented Feb. 23, 1926.

1,573,800

UNITED STATES PATENT OFFICE.

JOHN BOULLION, GEORGE BOULLION, AND PAUL BOULLION, OF CONDE, SOUTH DAKOTA.

MULCHING DEVICE FOR PLANTERS.

Application filed September 7, 1923. Serial No. 661,408.

*To all whom it may concern:*

Be it known that we, JOHN BOULLION, GEORGE BOULLION, and PAUL BOULLION, citizens of the United States, residing at Conde, in the county of Spink and State of South Dakota, have invented new and useful Improvements in a Mulching Device for Planters, of which the following is a specification.

This invention relates to a device for use in connection with corn planters, bean planters, and the like, which are adapted to plant seed in rows of varying distances apart and is particularly adapted for planters employing master wheels provided with concaved rims for completing the covering of the seed and pressing the soil thereupon by the weight of the machine.

One of the aims of this invention is to provide a device of this character constructed so as to follow in the wake of the master wheels of the planter for covering the tracks of the master wheels with a dirt mulch whereby to fill the depressed tracks of the wheels so as to bring the rows on a level or slightly above the level of the field.

Another aim of the invention is the provision of a mulching device for planters which may be raised above the level of the field when transporting the machine or meeting with obstructions, or which may be lowered in operative position upon the ground.

A further aim of this invention is to provide a device of this nature which is capable of lateral adjustment for rows of varying widths and is also provided with means for regulating the depth of the soil upon the rows.

A still further aim of this invention is to provide a device of this nature which is simple in construction, which can be readily attached to the planters now in use or which may be built in the planter construction during its manufacture.

These and other objects will more fully appear and the nature of the invention will be more clearly understood as described in the following specification, defined in the appended claims, and illustrated in the accompanying drawings, in which, Figure 1 is a side elevation of a two-row corn planter showing the invention in its applied operative position thereon;

Figure 1:
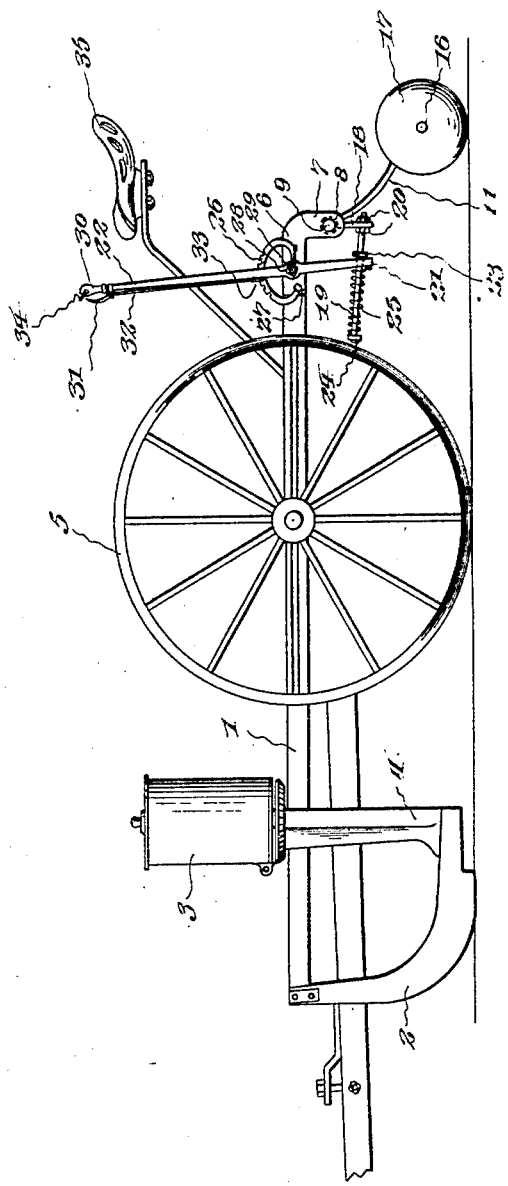
Figure 2:
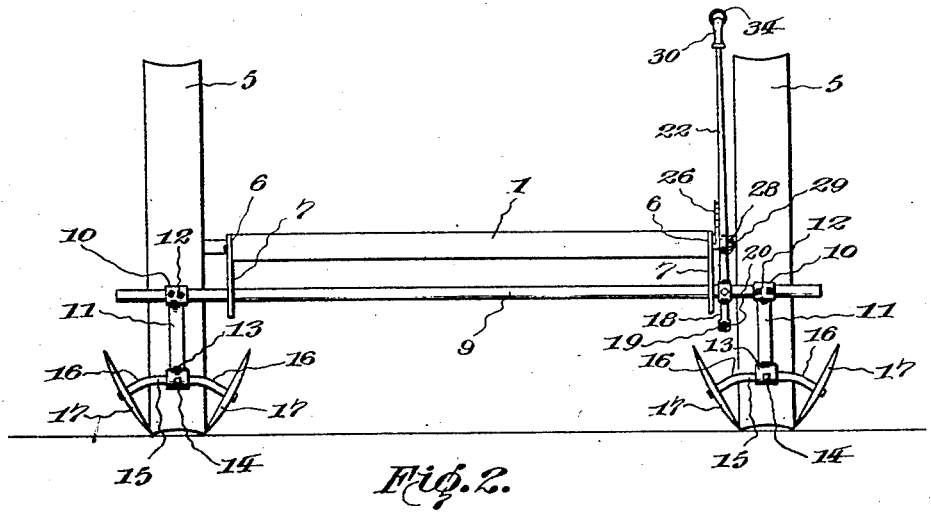
Fig. 2 is a rear end view of the planter showing the relative positions of the mulching disks at the rear of the respective master wheels of the planter.
Figure 3:
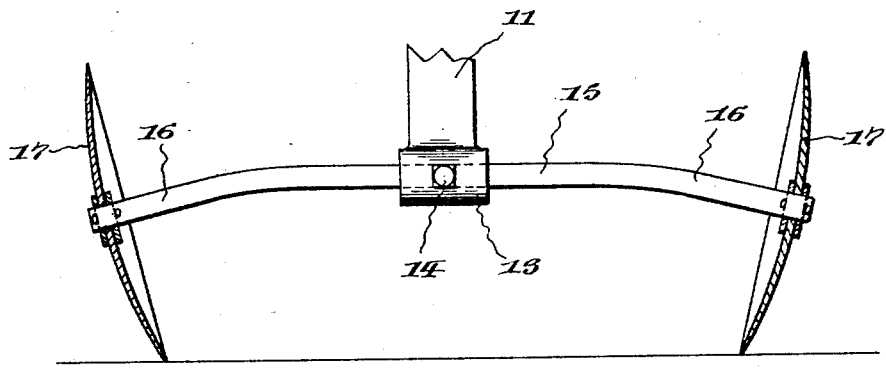
Fig. 3 is a fragmentary rear end view of the disks showing the detail construction of the means for revolubly and adjustably mounting the mulching disks upon their supports.
Figure 4:
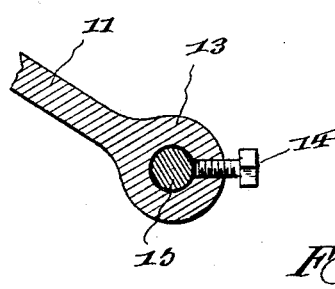
Fig. 4 is a detailed sectional view, showing the specific means employed for adjustably supporting the axles of the mulching disks.

We desire to here state that for the purpose of illustrating the construction and use of the invention, the same is shown as applied to a two-row corn planter, though the same is equally adaptable for use in connection with any other form of drill or check row planter, or the invention may be applied to a single-row planter.

Referring to the drawings, 1 denotes the frame of a planter, 2 the furrowers, 3 the grain hoppers, 4 the dropping tubes, and 5 the master wheels of the planter which are provided with the usual concaved rims.

Upon the side bars of the frame 1 at the rear ends thereof are secured the brackets 6 which are substantially L-shaped and provided with the depending arms 7 formed with the openings 8 adjacent their lower ends. Supported through the openings 8 in the depending arms 7 of the brackets and extending from bracket to bracket and projecting for a distance at the outer sides thereof is a draft bar or tube 9. Adjustably secured upon the projecting ends of the draft bar 9 are the upper eyes 10 of the draft arms 11, which are secured in their adjusted positions upon the bar 9 through the medium of the set screws 12. Also formed upon the draft arms 11 are the lower eyes 13 through which are adjustably secured by the set screws 14 the horizontal portions of the shafts 15, the shafts 15 having their ends deflected laterally from the horizontal portions 15 as shown at 16 and revolubly mounted upon the ends of the deflected portions 16 of the shafts 15 are oppositely disposed disks 17. The disks 17 being at right angles to the deflected portions 16 are maintained in substantially eccentric position to the horizontal portion of the shaft 15, the advantages of which will be hereinafter described.

Rigidly secured to the draft bar 9 is a rocker arm 18 provided at its lower end with an aperture through which is secured the threaded end of a rod 19 by the nuts 20 at opposite sides of the rocker arm 18. The rod 19 is slidably mounted through the eye 21 at the lower end of the operating lever 22. The eye 21 is adapted to contact with an adjusting nut 23 on the threaded end of the rod 19 and surrounding the remaining portion of the rod 19 between the eye 21 and the head 24 of the rod 19 is a tension spring 25 for normally retaining the eye 21 in contact with the nut 23. Upon one of the brackets 6, either at the right or left-hand side of the machine as preferred, is a quadrant 26, one end of which is secured upon the bracket by the bolt 27 which also secures this end of the bracket to the frame of the machine. The opposite end of the quadrant 26 is secured upon the bracket 6 by the bolt 28 which secures the bracket to the frame of the machine and also provides a pivot for the lever 22 by the bolt 28 passing through the eye or bearing 29 of the lever 22. Upon the upper end of the lever 22 is the handle 30 adjacent to which is the thumb piece 31 connected by the rod 32 to the spring latch member 33 adapted to engage the notches in the quadrant 26. The handle 30 is further provided with the swinging loop 34 adapted to be thrown over the thumb piece 31 for holding the thumb piece in close contact with the handle 30, whereby to maintain the latch member 33 out of engagement with the quadrant 26 wherein the lever 22 is adapted to float. The lever 22 and its accessories may be positioned at either preferred side of the seat 35 of the planter, the lever and its accessories and the mountings therefor being constructed in a manner to permit of these adjustments.

The operation of the device will be briefly described as follows:

When the invention is applied to a two-row planter, as illustrated in the drawings, the disks 17 which are arranged in pairs upon their respective draft arms 11 are adjusted upon the draft bar 9 in a manner so as to position the pairs of disks immediately behind the master wheels 5 of the planter and in the meantime the shaft 15 of the disks is so revolved in the eyes 13 of the draft bars 11 and retained in adjusted position by the set screws 14 so as to gather a certain amount of soil and deposit the same upon the depressed tracks of the master wheels which in a planter of this construction follow immediately behind the droppers of the planter and press the soil upon the seed due to the weight of the machine, thus necessarily leaving a depressed track in the soil which is below the level of the field. These tracks being of more or less depth and of a greater depth should the soil which is being planted be wet forms a hard crust when baked by the sun and retards the growth of the plants from the germinated seed by the difficulty they experience in breaking through this crust. By providing a mulch or in other words filling in the tracks with the disintegrated soil conserves the moisture within the earth, thus keeping the crust moist and enabling the plants to more readily break through as is readily understood by those acquainted with agricultural pursuits. At the same time this means of filling in the tracks of the master wheels raises the rows to a level or slightly above the level of the field and aids materially the subsequent cultivation of a crop, as clods, hard lumps, and the like, will not be thrown upon the growing plants by the cultivators when cultivating the crop. Furthermore, should it be desirous to deposit a greater mulch or deposit of soil upon the rows, the disks which are positioned so as to have a minor distance and a major distance therebetween, may now be adjusted by revolving the axle 15 in the eye 13 of the draft arm 11, so as to raise the minor distance upwardly and lower the major distance between the disks toward the ground, this adjustment being continued until the position of the disks is such that the disks will gather a more or less quantity of soil and cast the same laterally inwardly upon the row. When the planter is to be transported from one point of operation to another, the lever 22 will be pushed in a forward direction so that the disks 17 will be elevated above the ground. When renewing the planting operations the lever will be returned to its original position for placing the disks in operative position upon the ground and should it be found necessary to cause the disks to enter the ground to a greater depth, the lever 22 will be pulled further rearwardly so that the force of the eye 21 of the lever will be exerted against the tension spring 25 forcing the rod 19 forwardly so as to swing the rocker arm 18 forwardly thereby rocking the draft bar 9 which forces the draft arms 11 and disks 17 in a downward direction. When the soil is in prime condition for planting, the latch 33 may be held out of engagement with the quadrant in the manner hereinbefore described, whereby the lever 22 will become what is commonly known as a floating lever and the disks 17 will perform and function in a normal manner and automatically adjust themselves to any unevenness upon the surface of the ground.

From the foregoing, it will be seen that we have provided a device which is efficient in operation, and a meritorious acquisition to farming pursuits, these claims for this invention having been fully substantiated by gratifying results of previous practical experiments therewith.

While we have herein shown and described the preferred embodiment of the invention, the right is hereby reserved to make such alterations and variations therein from time to time to meet the exigencies of a given case and which will neither depart from the spirit of the invention nor the scope of the claims.

Having thus described my invention, what I claim as new and desire to secure by Letters Patent is:

1. The combination with a planter, of a cross bar rotatably secured to the planter frame, arms adjustably secured upon the ends of said cross bar, curved axles connected intermediate the ends thereof to said arms, inclined opposing disks mounted upon said curved axles, and means upon said arms to rotatably adjust said curved axles to vary the inclination of said disks to govern the extent of mulch.

2. The combination with a planter, of a cross bar rotatably secured to the planter frame, arms adjustably secured upon the ends of said cross bar, curved axles connected intermediate the ends thereof to said arms, inclined opposing disks mounted upon said curved axles, means upon said arms to rotatably adjust said curved axles to vary the inclination of said disks to govern the extent of mulch, and means for raising and lowering said disks and arms.

3. The combination with a planter; of a bar secured to the planter frame, an arm depending from said bar and provided with an eye at its lower end, the axis of the eye extending transversely of the planter, an axle having a straight central portion revolubly adjustable in said eye said axle having end portions each inclined at an angle to the central portion, disks revolubly mounted on said end portions, and means to hold the axle in adjusted position in the eye.

In testimony whereof we affix our signatures.

JOHN BOULLION.
GEORGE BOULLION.
PAUL BOULLION.